United States Patent
Yoshida (10) Patent No.: US 9,653,947 B2
(45) Date of Patent: May 16, 2017

(54) ELECTRIC POWER CONVERTER HAVING THE FUNCTION OF SWITCHING POWER SUPPLY SYSTEMS IN THE EVENT OF POWER FAILURE

(71) Applicant: FANUC CORPORATION, Yamanashi (JP)

(72) Inventor: Tomokazu Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/813,256

(22) Filed: Jul. 30, 2015

(65) Prior Publication Data
US 2016/0036269 A1    Feb. 4, 2016

(30) Foreign Application Priority Data
Aug. 1, 2014    (JP) .................. 2014-158055

(51) Int. Cl.
*H02J 9/06*    (2006.01)
(52) U.S. Cl.
CPC .................. *H02J 9/061* (2013.01)
(58) Field of Classification Search
USPC .......................................................... 307/65
See application file for complete search history.

(56) References Cited

U.S. PATENT DOCUMENTS

| | | |
|---|---|---|
| 2011/0215646 A1 | 9/2011 | Morishima et al. |
| 2012/0217809 A1* | 8/2012 | Sato .................. H02J 9/062 307/64 |

FOREIGN PATENT DOCUMENTS

| | | |
|---|---|---|
| JP | H04072844 U | 6/1992 |
| JP | H04322138 A | 11/1992 |
| JP | H10164772 A | 6/1998 |
| JP | 2002064936 A | 2/2002 |
| JP | 2006094599 A | 4/2006 |
| JP | 2009512956 | * 3/2009 |
| JP | 2009512956 A | 3/2009 |

(Continued)

OTHER PUBLICATIONS

English Abstract and machine translation for Japanese Publication No. 2011-135758, published Jul. 7, 2011, 32 pgs.

(Continued)

*Primary Examiner* — Hal Kaplan
*Assistant Examiner* — Xuan Ly
(74) *Attorney, Agent, or Firm* — Fredrikson & Byron, P.A.

(57) ABSTRACT

An electric power converter includes a power failure detection circuit for detecting a power failure state of each power supply system, a first switch having contact points connected to the power supply systems and one output terminal and, when the power failure detection circuit detects a power failure in at least one power supply system, switches to connect to the output terminal of the contact point connected to one of the other power supply systems, a second switch having a charging circuit to inhibit an inrush current from the power supply systems and one input terminal connected to the output terminal of the first switch and switches to connect the input terminal to a contact point on an input side of the charging circuit for a predetermined duration in synchronization with the switching among the power supply systems by the first switch unit, and an electric power conversion circuit.

3 Claims, 9 Drawing Sheets

(56) References Cited

FOREIGN PATENT DOCUMENTS

JP          2011135758 A     7/2011

OTHER PUBLICATIONS

Untranslated Decision to Grant a Patent mailed by Japanese Patent Office on Feb. 23, 2016 for Japanese Patent Application 2014-158055, 3 pages.
Translated Decision to Grant a Patent mailed by Japanese Patent Office on Feb. 23, 2016 for Japanese Patent Application 2014-158055, 3 pages.
Untranslated Notification of Reasons for Rejection mailed by Japanese Patent Office on Feb. 23, 2016 for Japanese Patent Application 2014-158055, 4 pages.
Translated Notification of Reasons for Rejection mailed by Japanese Patent Office on Feb. 23, 2016 for Japanese Patent Application 2014-158055, 3 pages.
Partial English Translation of Japanese Publication No. 2009512956, published Mar. 26, 2009, 15 pages.
English Translation of Japanese Publication No. 2006094599, published Apr. 6, 2006, 14 pages.
English Translation of Abstract for Japanese Publication No. 2002064936, published Feb. 28, 2002, 1 page.
English Translation of Abstract for Japanese Publication No. H10164772, published Jun. 19, 1998, 1 page.
Partial English Translation of Japanese Publication No. H04322138, published Nov. 12, 1992, 8 pages.
Partial English Translation of Japanese Publication No. H04072844, published Jun. 26, 1992, 2 pages.

\* cited by examiner

ELECTRIC POWER CONVERTER HAVING THE FUNCTION OF SWITCHING POWER SUPPLY SYSTEMS IN THE EVENT OF POWER FAILURE

CROSS-REFERENCE TO RELATED APPLICATIONS

This application is a new U.S. patent application that claims benefit of JP 2014-158055, filed on Aug. 1, 2014, the entire content of JP 2014-158055 is hereby incorporated by reference.

FIELD OF THE INVENTION

The present invention relates to an electric power converter, and more specifically relates to an electric power converter that continues to supply electric power to a load in the event of a power failure by switching power supply systems.

BACKGROUND OF THE INVENTION

In a power supply device using an electric power conversion circuit, as a method for inhibiting an inrush current to a smoothing capacitor that is caused by a voltage difference between a power supply system and the smoothing capacitor, there is known a method in which the electric power conversion circuit is bypassed such that the inrush current does not flow therethrough (for example, Japanese Patent Application Laid-Open No. 2011-135758 (JP 2011-135758 A)).

Figure 1:
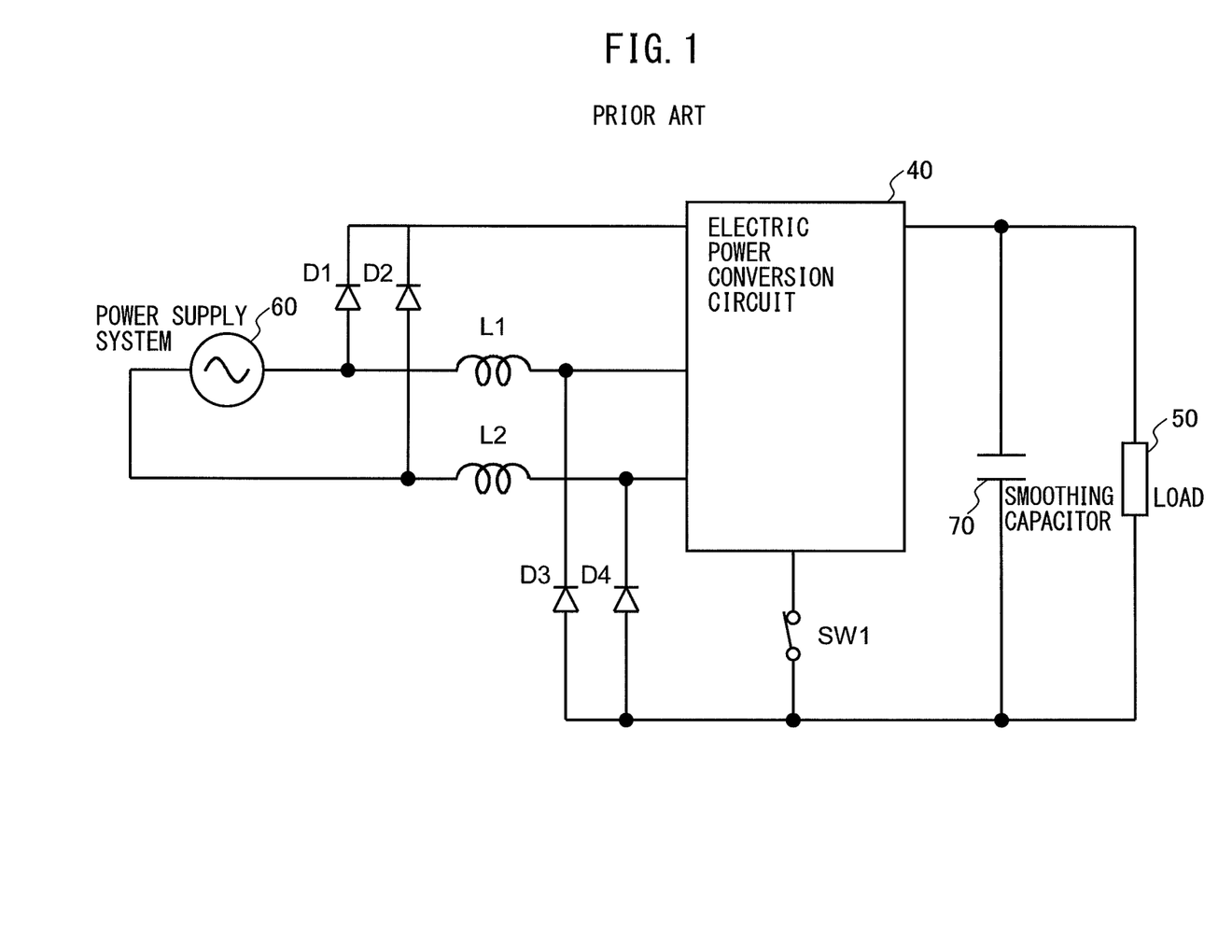
FIG. 1 is a block diagram of a conventional electric power converter.

FIG. 1 shows a block diagram of a conventional electric power converter. A power supply system 60 is an alternating-current (AC) power supply to supply AC power to an electric power conversion circuit 40 through reactors L1 and L2. Direct-current (DC) power, being an output of the electric power conversion circuit 40, is fed to a smoothing capacitor 70, and smoothed electric power is fed to a load 50.

In the above conventional technique, when a voltage difference occurs between the power supply system 60 and the smoothing capacitor 70, a switch SW1 connected to the electric power conversion circuit 40 is first turned off. Thus, an inrush current flows through diodes D1 to D4 and hence does not flow into the electric power conversion circuit 40. However, the diodes D1 to D4 that can withstand the inrush current have to be prepared. Additionally, the power supply system 60 of three-phase AC requires six diodes in total, resulting in cost and size problems.

Figure 2:
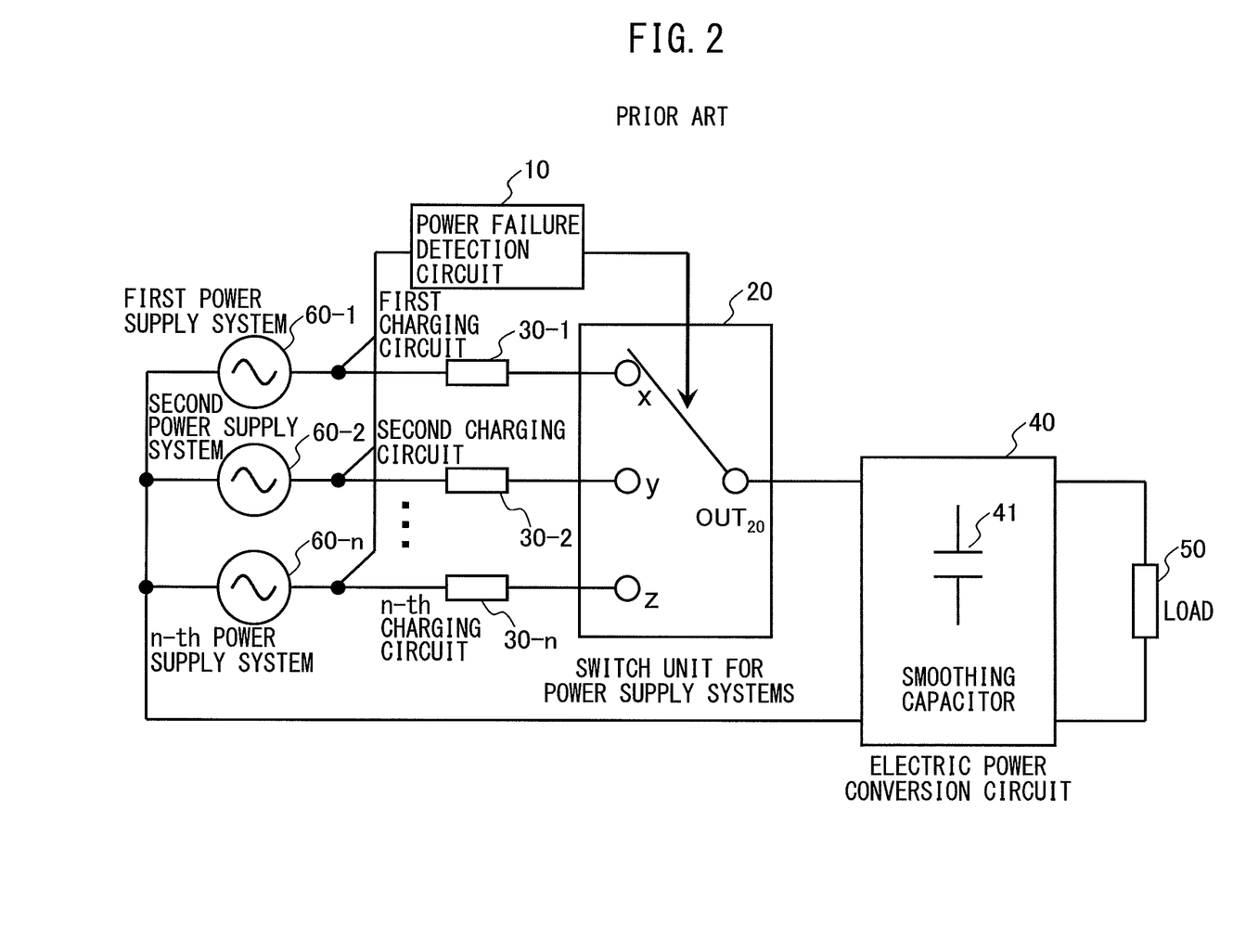
FIG. 2 is a block diagram of a conventional electric power converter having charging circuits.

There is known a power supply device using an electric power conversion circuit that has a plurality of power supply systems for use in an emergency, other than a main power supply system, in order to continue supplying electric power to a load in the event of a power failure. FIG. 2 shows a block diagram of a conventional power supply device. An n number of power supply systems in total, i.e. a first power supply system 60-1, a second power supply system 60-2, . . . , and an n-th power supply system 60-n are connected in parallel as the power supply systems. A power failure detection circuit 10 is connected to each of the n number of power supply systems. The power failure detection circuit 10 detects the presence or absence of a power failure in each of the n number of power supply systems. A first charging circuit 30-1, a second charging circuit 30-2, . . . , and an n-th charging circuit 30-n are connected to the first power supply system 60-1, the second power supply system 60-2, . . . , and the n-th power supply system 60-n, respectively. Furthermore, outputs of the first charging circuit 30-1, the second charging circuit 30-2, . . . , and the n-th charging circuit 30-n are connected to contact points x, y, . . . , z of a changing switch 20, respectively.

The power failure detection circuit 10 detects the presence or absence of a power failure in the n number of power supply systems, and switches the power supply system changing switch 20 based on detection results. By way of example, the changing switch 20 first connects the contact point x on an input side to a terminal $OUT_{20}$ on an output side to feed electric power from the first power supply system 60-1 to the electric power conversion circuit 40. At this time, if the power failure detection circuit 10 detects the occurrence of a power failure in the first power supply system 60-1, the power failure detection circuit 10 controls the power supply system changing switch 20, such that the contact point y on the input side is connected to the terminal $OUT_{20}$ on the output side and electric power is fed from the second power supply system 60-2. In a like manner, when the power failure detection circuit 10 detects the occurrence of a power failure in the second power supply system 60-2, the power failure detection circuit 10 controls the power supply system changing switch 20, such that the contact point z on the input side is connected to the terminal $OUT_{20}$ on the output side and electric power is fed from the n-th power supply system 60-n (n 3).

In the conventional power supply device shown in FIG. 2, in switching from a power supply system having a power failure to a normal power supply system having no power failure, there is a delay in a switching operation of the power supply system changing switch 20. Thus, there is a case in which a smoothing capacitor 41 in the electric power conversion circuit 40 is discharged and a potential difference occurs between the power supply system and the smoothing capacitor 41. At this time, switching the power supply systems in a state of having the potential difference causes a flow of an inrush current through the smoothing capacitor 41 and damages a switching element and the like in the electric power conversion circuit 40.

Figure 3:
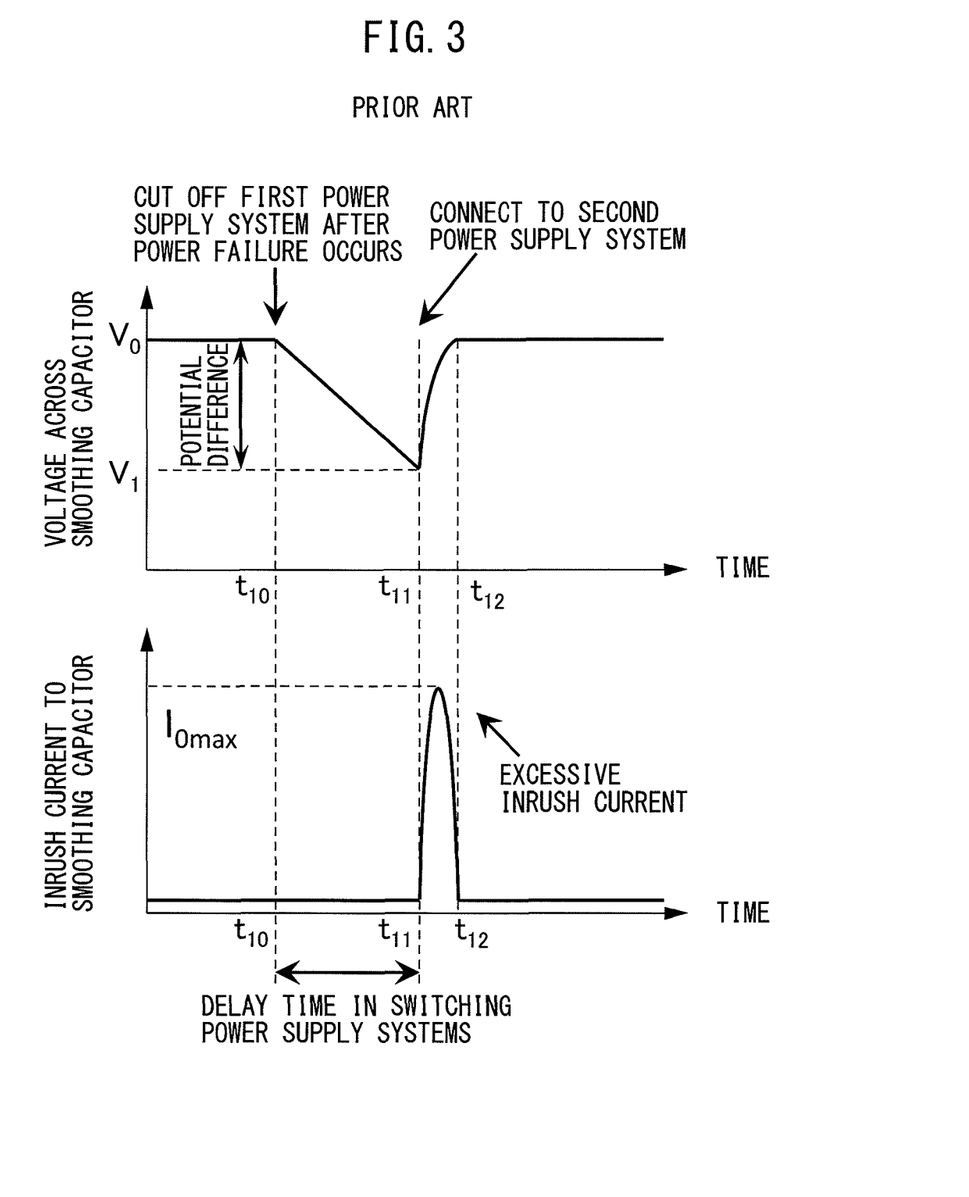
FIG. 3 is a timing chart of the voltage of a smoothing capacitor and an inrush current in the conventional electric power converter.

The inrush current flowing through the smoothing capacitor 41 upon the switching of the power supply systems will be described with reference to a timing chart of FIG. 3. FIG. 3 shows the variation in voltage of the smoothing capacitor 41 and the inrush current to the smoothing capacitor 41 with time when switching the power supply systems due a power failure. First, the electric power is fed from the first power supply system 60-1 until time $t_{10}$, so that the smoothing capacitor 41 in the electric power conversion circuit 40 is charged with a voltage $V_0$. Then, if the power failure occurs at the time $t_{10}$, the voltage of the smoothing capacitor 41 is gradually discharged and decreases with time.

As shown in FIG. 2, when a power failure occurs in the first power supply system 60-1, the power failure detection circuit 10 detects the power failure and controls the power supply system changing switch 20 so as to select the second power supply system 60-2. However, since it takes a predetermined amount of time from the detection of the power failure to complete the switching of the changing switch 20, the voltage of the smoothing capacitor 41 decreases to $V_1$ until time $t_{11}$ at the point in time of completing the switching to the second power supply system 60-2. In switching from the first power supply system 60-1 to the second power supply system 60-2 at the time $t_{11}$, the smoothing capacitor 41 is charged in accordance with the magnitude of the potential difference ($=V_0-V_1$), which is the decrease in the voltage of the smoothing capacitor 41 and hence the inrush current flows through the smoothing capacitor 41. At this time, provided that the charging of the smoothing capacitor 41 is completed at time $t_{12}$, the shorter the time between the time $t_{11}$ of switching to the second power supply system 60-2 and the time $t_{12}$, the larger the inrush current flowing through the smoothing capacitor 41. $T_{0max}$ represents a maximum value of the inrush current.

As shown in FIG. 2, there is known a method in general in which the charging circuits 30-1, 30-2, ..., 30-$n$ are provided in series to the power supply systems 60-1, 60-2, ..., 60-$n$, respectively, to inhibit the inrush current in switching the power supply systems. However, it is necessary to provide the charging circuit for each individual power supply system, resulting in cost and size problems.

Figure 4:
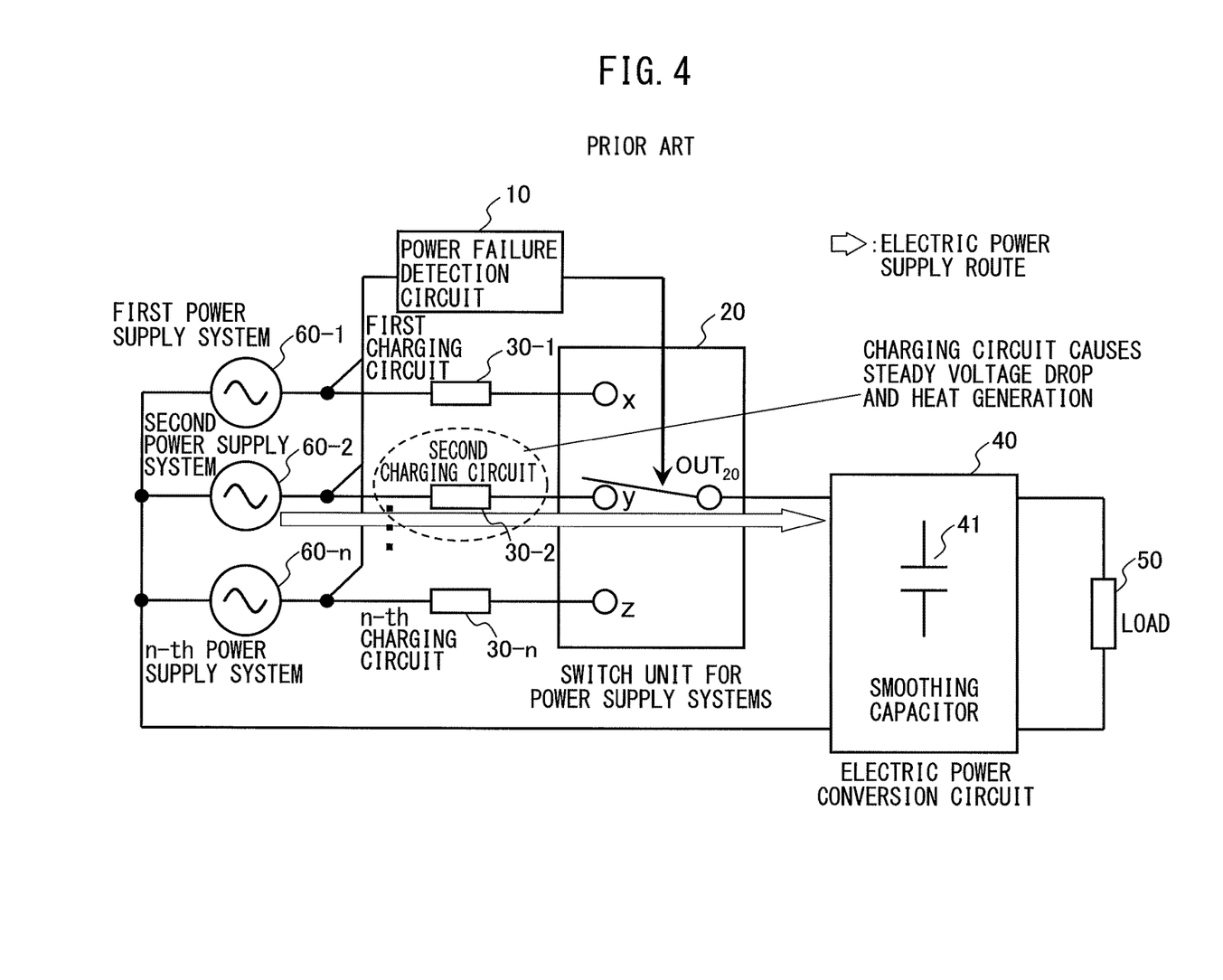
FIG. 4 is a block diagram of the conventional electric power converter having the charging circuits.

Also, as shown in FIG. 4, the electric power is fed continuously through the charging circuit, even after the power supply systems are switched from the first power supply system 60-1 having the power failure to the normal second power supply system 60-2 having no power failure and the second charging circuit 30-2 inhibits the inrush current to the smoothing capacitor 41. Therefore, parts such as current-limiting resistor or inductance, which constitute the charging circuit, bring about a voltage drop across the power supply system and degrade electric power conversion efficiency. Moreover, heat generated by the parts themselves affects the life of elements and peripheral circuits.

An object of the present invention is to provide an electric power converter that can switch power supply systems in a stable manner in the event of a power failure, with preventing an increase in the number of parts, a voltage drop across the power supply system, and an increase in heat generated in the electric power converter.

SUMMARY OF THE INVENTION

An electric power converter of one embodiment of the present invention includes a power failure detection circuit connected to a plurality of power supply systems, for detecting a power failure state of each of the plurality of power supply systems; a first switch unit having a plurality of contact points connected to the plurality of power supply systems and one output terminal, and when the power failure detection circuit detects a power failure of at least one of the plurality of power supply systems, the first switch unit performing switching so as to connect to the output terminal the contact point connected to one of the power supply systems other than the power supply system having the detected power failure, in accordance with a power failure detection result of the power failure detection circuit; a second switch unit having a charging circuit for inhibiting an inrush current from the plurality of power supply systems and one input terminal connected to the output terminal of the first switch unit, and the second switch unit performing switching so as to connect the input terminal to a contact point on an input side of the charging circuit for a predetermined duration of time in synchronization with the switching among the power supply systems by said first switch unit; and an electric power conversion circuit connected to the output terminal of said second switch unit.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

An electric power converter according to the present invention will be described below with reference to the drawings. Note that, the technical scope of the present invention is not limited to embodiments thereof, but extends to the invention described in the claims and equivalents thereof.

[First Embodiment]

Figure 5:
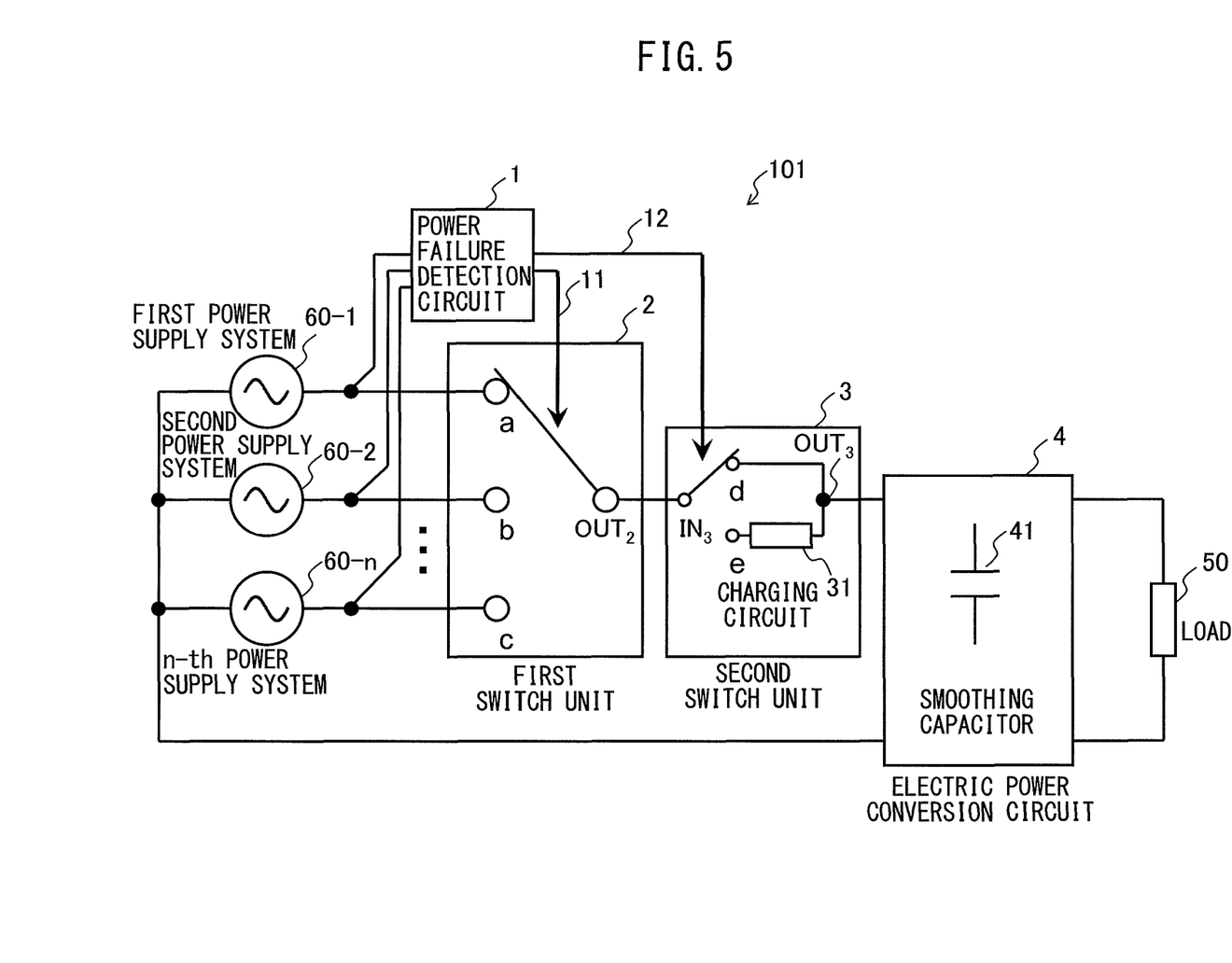
FIG. 5 is a block diagram of an electric power converter according to a first embodiment of the present invention.

First, an electric power converter according to a first embodiment of the present invention will be described with reference to the drawings. FIG. 5 is a block diagram of an electric power converter according to the first embodiment of the present invention. An electric power converter 101 according to the first embodiment of the present invention is constituted of a power failure detection circuit 1 that is connected to a plurality of power supply systems 60-1, 60-2, ..., 60-$n$ and detects a power failure of each of the plurality of power supply systems, a first switch unit 2 that has a plurality of contact points a, b, c connected to the plurality of power supply systems and one output terminal $OUT_2$ and performs switching so as to connect the contact point connected to one of the power supply systems other than the power supply system having a power failure to the output terminal $OUT_2$ in accordance with a power failure detection result of the power failure detection circuit 1, when the power failure detection circuit 1 detects the power failure in at least one of the plurality of power supply systems, a second switch unit 3 that has a charging circuit 31 for inhibiting an inrush current from the plurality of power supply systems and one input terminal $IN_3$ connected to the output terminal $OUT_2$ of the first switch unit 2 and performs switching so as to connect the input terminal $IN_3$ to a contact point "e" on an input side of the charging circuit 31 for a predetermined duration of time in synchronization with the switching among the power supply systems by the first switch unit 2, and an electric power conversion circuit 4 connected to the output terminal of the second switch unit 3.

When a power failure occurs in the first power supply system 60-1 and the power failure detection circuit 1 detects the power failure, a contact point to be connected to the output terminal $OUT_2$ of the first switch unit 2 is switched from the contact point "a" to the contact point "b". In synchronization with this, a contact point to be connected to the input terminal $IN_3$ of the second switch unit 3 is switched from a contact point "d" to the contact point "e", so that the charging circuit 31 is effective. In other words, the charging circuit 31 is connected between the power supply system and the electric power conversion circuit 4. The operation delay time that occurs in switching from the first power supply system 60-1 to the second power supply system 60-2 by the first switch unit 2 reduces electric charge accumulated in a smoothing capacitor 41, and decreases a voltage between both ends of the smoothing capacitor 41. Thus, a potential difference occurs across the second power supply system 60-2 and the voltage between the both ends of the smoothing capacitor 41. However, since the charging circuit 31 is effective, no large inrush current flows through the smoothing capacitor 41, and hence it is possible to charge the smoothing capacitor 41 in a safe manner to the potential of the second power supply system 60-2. Here, the charging circuit 31 may be composed of a resistance (charging resistance).

After the charging circuit 31 is made effective by the second switch unit 3 for the predetermined duration of time, a contact point to be connected to the input terminal $IN_3$ of the second switch unit 3 is switched from the contact point "e" to the contact point "d" to make the charging circuit 31 ineffective. In other words, the power supply system and the electric power conversion circuit 4 are directly connected without interposing the charging circuit 31. Thereby, it is possible to prevent a voltage drop owing to the charging circuit 31 and heat generation from the charging circuit 31 itself.

Moreover, when the second power supply system 60-2 also has a power failure, switching from the second power supply system 60-2 to the n-th power supply system 60-$n$ (n 3) is performed using the above procedure. Therefore, it is possible to connect the single charging circuit 31 to the plurality of power supply systems and inhibit the inrush current to the smoothing capacitor 41 with a small number of parts.

The power failure detection circuit 1 for monitoring a power failure in each of the power supply systems may be disposed outside the electric power converter 101. Alternatively, a signal of, for example, a general-purpose power failure detection circuit or the like may be inputted to the electric power converter to control the first switch unit 2 and the second switch unit 3.

The power supply system may be a single-phase alternating current (AC) power supply, a three-phase AC power supply, a direct current (DC) power supply, or an energy accumulator typified by an electric double layer capacitor.

Arranging a direct connecting portion which connects the contact point "d" to the output terminal "$OUT_3$" directly in the second switch unit 3 in parallel to the charging circuit 31 makes it possible to switch the effectiveness and ineffectiveness of the charging circuit 31 by a single switching operation. Thus, it is possible to reduce the number of switching operations and switching noise.

Figure 6:
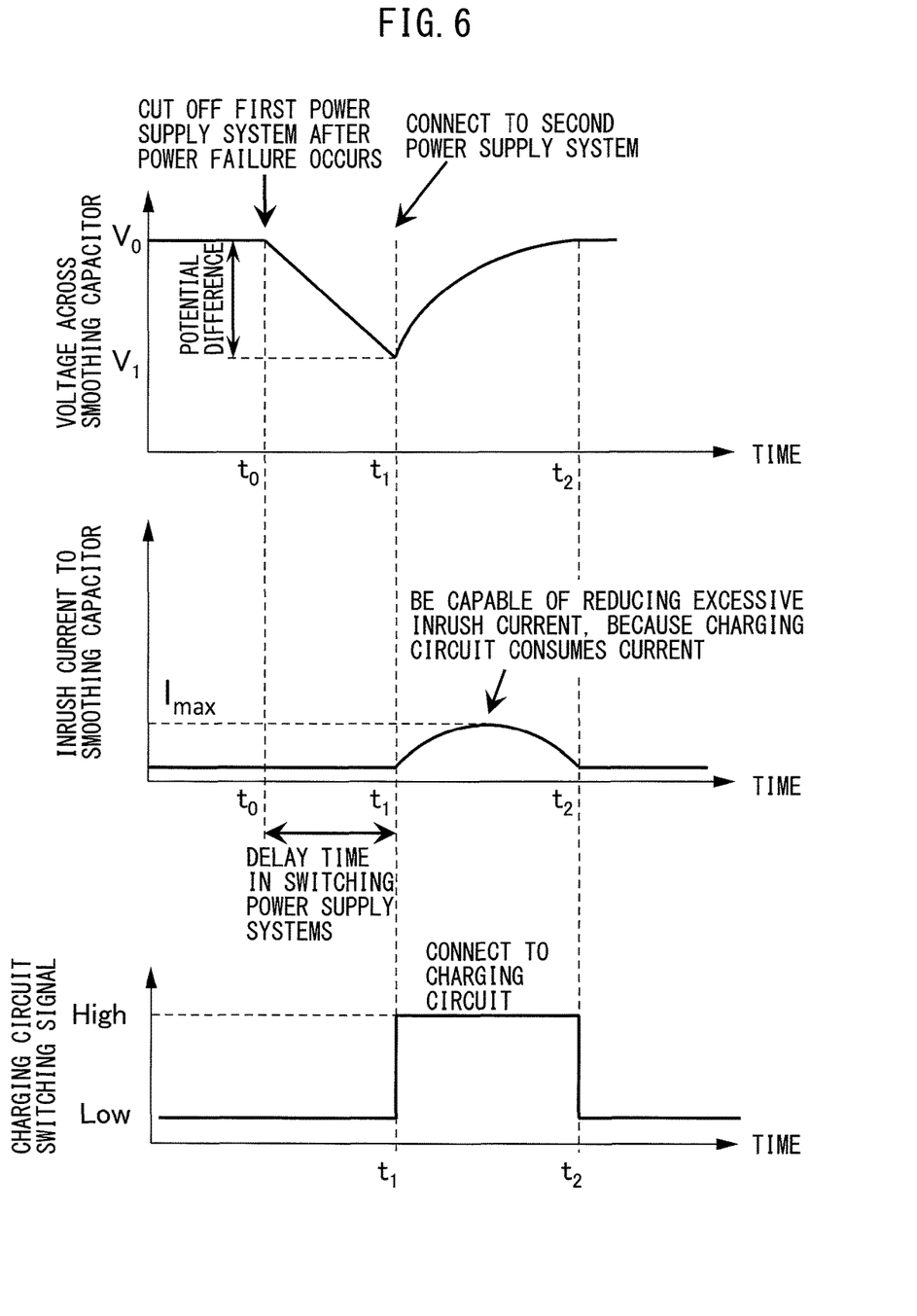
FIG. 6 is a timing chart of the voltage of a smoothing capacitor, an inrush current, and a charging circuit switching signal in the electric power converter according to the first embodiment of the present invention.

As described above, in the electric power converter according to the first embodiment of the present invention, electric power is fed from the power supply system to the electric power converter through the charging circuit for the predetermined duration of time. Next, "the predetermined duration of time" for which the charging circuit is connected will be described. FIG. 6 shows a timing chart of the voltage of the smoothing capacitor, the inrush current to the smoothing capacitor, and a charging circuit switching signal in the electric power converter according to the first embodiment of the present invention. The charging circuit switching signal is a signal to be outputted from the power failure detection circuit 1 to the second switch unit 3 in order to switch the connection of the charging circuit 31, more specifically a signal to be outputted to wiring 12 to switch the connection between the input terminal $IN_3$ and the contact point "d" or "e".

First, the electric power is fed from the first power supply system 60-1 and the smoothing capacitor 41 in the electric power converter 4 is charged with a voltage $V_0$ until time $t_0$. Then, when a power failure occurs at the time $t_0$, the voltage charged in the smoothing capacitor 41 is gradually discharged so that the voltage of the smoothing capacitor 41 decreases with time.

As shown in FIG. 5, when the power failure occurs in the first power supply system 60-1, the power failure detection circuit 1 detects the power failure and controls the first switch unit 2 for the electric power systems so as to select the second power supply system 60-2. However, since it takes a predetermined amount of time from the detection of the power failure to complete the switching of the first switch unit 2 for the power supply systems, the voltage of the smoothing capacitor 41 decreases to $V_1$ until time $t_1$ at the point in time of switching to the second power supply system 60-2. Upon switching to the second power supply system 60-2 at the time $t_1$, the smoothing capacitor 41 is charged in accordance with the magnitude of the potential difference ($=V_0-V_1$), which is the decrease in the voltage of the smoothing capacitor 41, and hence the inrush current flows through the smoothing capacitor 41. At this time, provided that the charging of the smoothing capacitor 41 is completed at time $t_2$, the inrush current flows through the smoothing capacitor 41 in a period between the time $t_1$ at the time of switching to the second power supply system 60-2 and the time $t_2$. $I_{max}$ represents a maximum value of the inrush current.

In the electric power converter according to the first embodiment of the present invention, an electric current flows from the power supply system to the electric power conversion circuit 4 through the charging circuit 31 for the predetermined duration of time. In other words, in a period between the time $t_1$ at the time of completing the switching from the first power supply system 60-1 to the second power supply system 60-2 and the time $t_2$ at the time of completing the charging of the smoothing capacitor 41, the charging circuit switching signal to be transmitted from the power failure detection circuit 1 to the second switch unit 3 rises from a low level to a high level. As a result, the charging circuit 31 consumes the electric current and therefore reduces the large inrush current. In other words, the electric current $I_{max}$ that flows through the smoothing capacitor 41 in the electric power conversion circuit 4 through the charging circuit 31 is made smaller than an electric current $I_{0max}$ (see FIG. 3) that flows without passing through the charging circuit. Here, "the predetermined duration of time" may be the period between the time $t_1$ and the time $t_2$. The period between the time $t_1$ and the time $t_2$ can be calculated from the delay time in switching the power supply systems and the capacitance of the smoothing capacitor.

Furthermore, in the electric power converter according to the first embodiment of the present invention, the charging circuit switching signal is switched from a high level to a low level to disconnect the charging circuit 31 at the time $t_2$ at which the charging of the smoothing capacitor 41 is completed. In other words, by the charging circuit switching signal transmitted from the power failure detection circuit 1 to the second switch unit 3 through the wiring 12, the connection between the input terminal $IN_3$ and the contact point "e" is switched to the connection between the input terminal $IN_3$ and the contact point "d". As a result, after the completion of the charging of the smoothing capacitor 41, the electric current flowing from the power supply system to the electric power conversion circuit 4 does not pass through the charging circuit 31, and hence it is possible to prevent a steady voltage drop and heat generation caused by the charging circuit 31.

Figure 7:
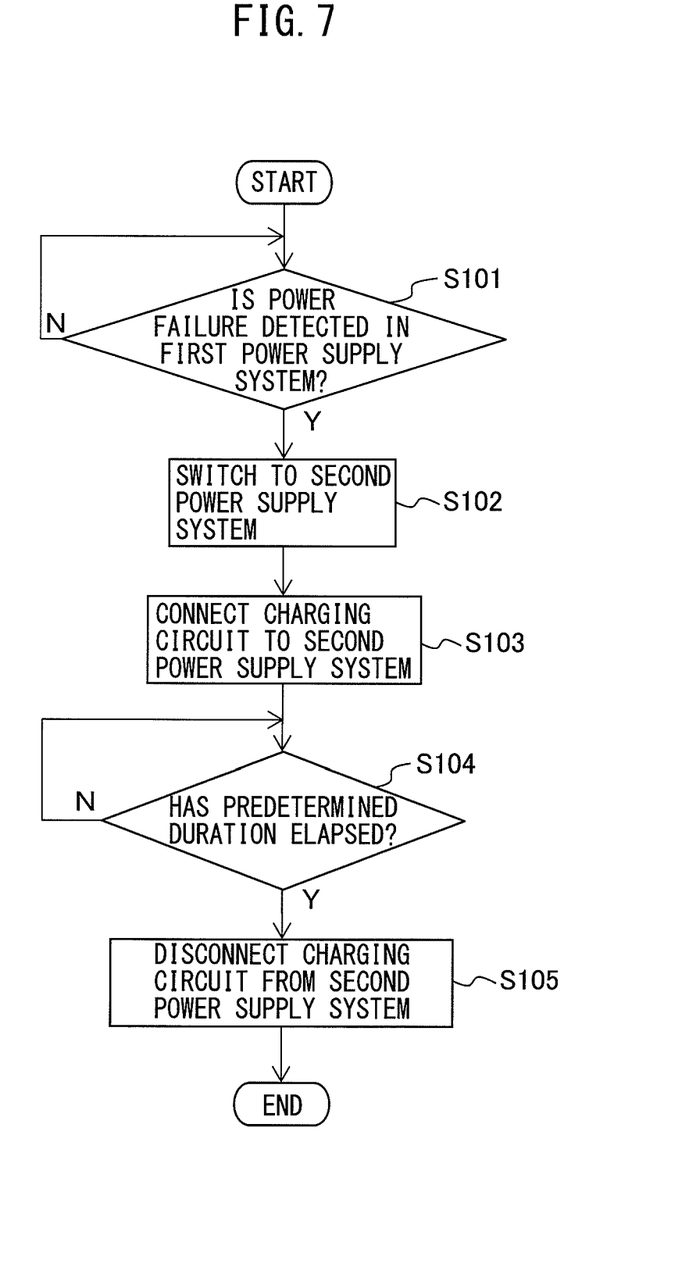
FIG. 7 is a flowchart of an operation procedure of the electric power converter according to the first embodiment of the present invention.

Next, an operation procedure of the electric power converter according to the first embodiment of the present invention will be described with the use of the flowchart shown in FIG. 7. First, in step S101, the power failure detection circuit 1 judges whether or not a power failure is occurring in the first power supply system 60-1. When no power failure is detected, the operation returns to the step S101 and the detection of the power failure is continued.

On the other hand, in a case where the power failure detection circuit 1 detects the occurrence of the power failure in the first power supply system 60-1, switching to the second power supply system 60-2 is performed in step S102. To be more specific, as shown in FIG. 5, a signal is transmitted from the power failure detection circuit 1 to the first switch unit 2 through wiring 11, to switch a contact point to be connected to the output terminal $OUT_2$ from the contact point "a" to the contact point "b". Note that, it is conceivable that the second power supply system 60-2 also has a power failure, and in such a case, switching to the n-th power supply system 60-$n$ ($n \geq 3$) may be performed.

Then, in step S103, the power failure detection circuit 1 controls the second switch unit 3 so as to connect the charging circuit 31 to the second power supply system 60-2. More specifically, as shown in FIG. 5, the power failure detection circuit 1 controls the second switch unit 3 through the wiring 12 so as to switch a contact point to be connected to the input terminal $IN_3$ from the contact point "d" to the contact point "e".

Then, in step S104, the power failure detection circuit 1 judges whether or not "the predetermined duration of time" for which the charging circuit 31 is interposed between the second power supply system 60-2 and the electric power conversion circuit 4 has elapsed since the power supply systems are switched from the first power supply system 60-1 to the second power supply system 60-2. Here, "the predetermined duration of time" may be stored in advance in memory (not shown) provided in the power failure detection circuit 1. Note that, "the predetermined duration of time" for which the charging circuit 31 is connected is a period in which an electric current that is larger than that in a steady state flows through the smoothing capacitor 41.

When the power failure detection circuit 1 judges that the predetermined duration of time has not elapsed yet in the step S104, the operation goes back to the step S104 to continue the judgment as to whether or not the predetermined duration of time has elapsed.

On the other hand, when the power failure detection circuit 1 judges that the predetermined duration of time has elapsed in the step S104, the power failure detection circuit 1 disconnects the charging circuit 31 from the second power supply system 60-2 in step S105. To be more specific, as shown in FIG. 5, the power failure detection circuit 1 controls the second switch unit 3 through the wiring 12 so as to switch a contact point to be connected to the input terminal $IN_3$ from the contact point "e" to the contact point "d".

As described above, the electric power converter according to the first embodiment of the present invention is provided with only the one charging circuit, instead of providing the charging circuits for the individual power supply systems as in a conventional manner. Furthermore, the charging circuit is made ineffective, in other words, the charging circuit is disconnected after the charging circuit is made effective for the predetermined duration of time for the purpose of inhibiting the inrush current that flows through the smoothing capacitor by switching from the power supply system having the power failure to the normal power supply system having no power failure, so that it is possible to prevent a voltage drop across the charging circuit and heat generation in the charging circuit itself.

[Second Embodiment]

Figure 8:
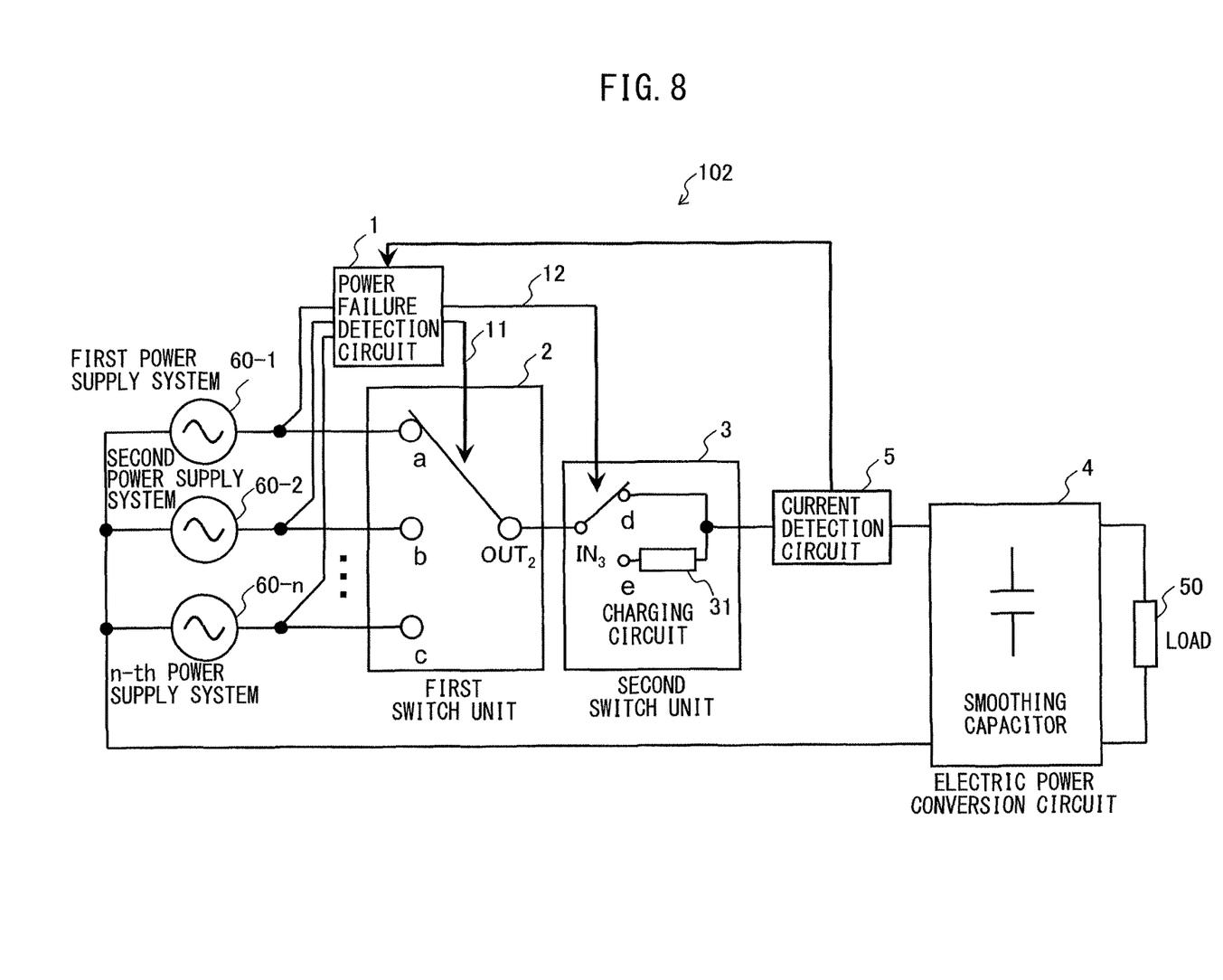
FIG. 8 is a block diagram of an electric power converter according to a second embodiment of the present invention.

Next, an electric power converter according to a second embodiment of the present invention will be described. FIG. 8 shows a block diagram of the electric power converter according to the second embodiment of the present invention. An electric power converter 102 according to the second embodiment of the present invention is different from the electric power converter 101 according to the first embodiment, in terms of further providing a current detection circuit 5 for detecting an electric current flowing from the second switch unit 3 to the electric power conversion circuit 4 and the power failure detection circuit 1 determining the predetermined duration of time for which the charging circuit 31 is connected by controlling the second switch unit 3 based on the electric current detected by the current detection circuit 5. The other components of the electric power converter 102 according to the second embodiment are the same as those of the electric power converter 101 according to the first embodiment, so the detailed description thereof will be omitted.

In the electric power converter 101 according to the first embodiment, the charging circuit 31 is connected between the power supply system and the electric power conversion circuit 4 for the predetermined duration of time in which an electric current that is larger than that in the steady state flows through the smoothing capacitor 41 in order to prevent a large inrush current from flowing through the smoothing capacitor 41, and this predetermined duration is stored in advance in the power failure detection circuit 1. On the other hand, in the electric power converter 102 according to the second embodiment of the present invention, the current detection circuit 5 is provided between the second switch unit 3 and the electric power conversion circuit 4 to detect an electric current flowing from the second switch unit 3 to the electric power conversion circuit 4. Data about the electric current detected by the current detection circuit 5 is transmitted to the power failure detection circuit 1, so that the power failure detection circuit 1 controls the second switch unit 3 based on the electric current detected by the current detection circuit 5 to switch a connection between the input terminal $IN_3$ and the contact point "d" or the contact point "e" in the second switch unit 3.

For example, a power failure is detected in the first power supply system 60-1, the power failure detection circuit 1 switches the power supply systems from the first power supply system 60-1 to the second power supply system 60-2 by switching a contact point to be connected to the output terminal $OUT_2$ from the contact point "a" to the contact point "b" in the first switch unit 2. At the same time, the power failure detection circuit 1 transmits the charging circuit switching signal to the second switch unit 3 through the wiring 12 to switch a contact point to be connected to the input terminal $IN_3$ from the contact point "d" to the contact point "e". This point in time is a start point of the predetermined duration for which the charging circuit 31 is connected.

Provided that the power supply systems are switched from the first power supply system 60-1 having the power failure to the second power supply system 60-2 having no power failure, an electric current that is larger than that in the steady state flows through the smoothing capacitor 41 in the electric power conversion circuit 4, to charge the smoothing capacitor 41. When the charging of the smoothing capacitor 41 is completed, an electric current value returns to that in the steady state. The current detection circuit 5 monitors the electric current flowing through the smoothing capacitor 41, and transmits the data about the detected electric current to the power failure detection circuit 1. When the power failure detection circuit 1 detects the return of the electric current value from the larger state to the steady state, the power failure detection circuit 1 transmits the charging circuit switching signal to the second switch unit 3 through the wiring 12 to switch a contact point to be connected to the input terminal $IN_3$ from the contact point "e" to the contact point "d". This point in time is an end point of the predetermined duration for which the charging circuit 31 is connected.

Figure 9:
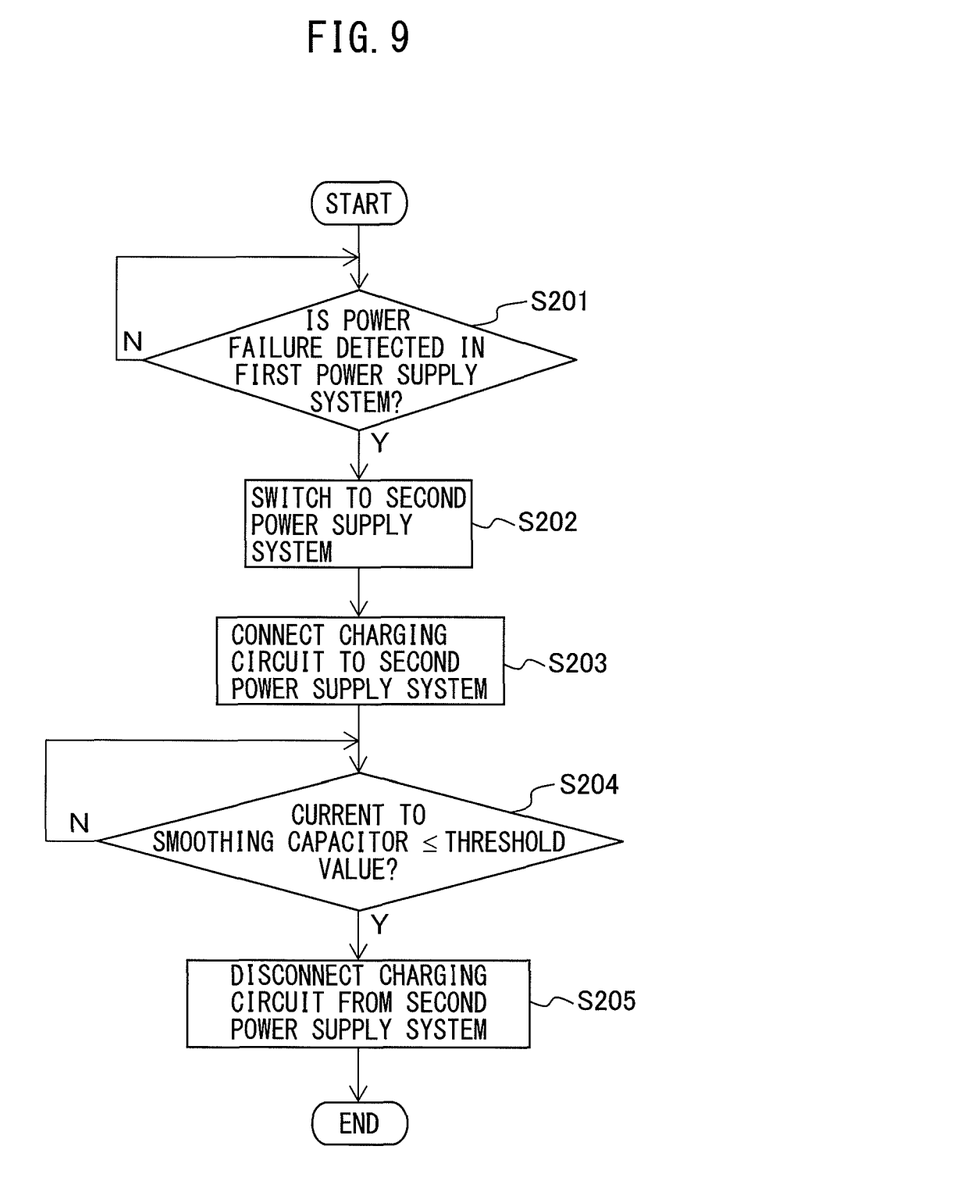
FIG. 9 is a flowchart of an operation procedure of the electric power converter according to the second embodiment of the present invention.

Next, an operation procedure of the electric power converter according to the second embodiment of the present invention will be described with the use of a flowchart shown in FIG. 9. First, in step S201, the power failure detection circuit 1 judges whether or not a power failure occurs in the first power supply system 60-1. In the case of detecting no power failure, the operation goes back to the step S201 to continue the detection of the power failure.

On the other hand, in a case where the power failure detection circuit 1 detects the occurrence of the power failure in the first power supply system 60-1, the electric power systems are switched from the first power supply system 60-1 to the second power supply system 60-2 in step S202. To be more specific, as shown in FIG. 8, a signal is transmitted from the power failure detection circuit 1 to the first switch unit 2 through the wiring 11, to switch a contact point to be connected to the output terminal $OUT_2$ from the contact point "a" to the contact point "b". Note that, it is conceivable that the second power supply system 60-2 also has a power failure, and in such a case, switching to the n-th power supply system 60-$n$ ($n \geq 3$) may be performed.

Then, in step S203, the power failure detection circuit 1 controls the second switch unit 3 so as to connect the charging circuit 31 to the second power supply system 60-2. More specifically, as shown in FIG. 8, the power failure detection circuit 1 controls the second switch unit 3 through the wiring 12 so as to switch a contact point to be connected to the input terminal $IN_3$ from the contact point "d" to the contact point "e".

Then, in step S204, the power failure detection circuit 1 judges based on the electric current value detected by the current detection circuit 5 whether or not the electric current to the smoothing capacitor 41 in the electric power conversion circuit 4 is equal to or less than a threshold value. The threshold value may be an electric current value flowing through the smoothing capacitor 41 in the steady state.

Provided that the electric current to the smoothing capacitor 41 is not judged to be equal to or less than the threshold value, the operation goes back to the step S204 to continue the judgment as to whether or not the electric current to the smoothing capacitor 41 is equal to or less than the threshold value.

On the other hand, in a case where the electric current to the smoothing capacitor 41 is judged to be equal to or less than the threshold value in the step S204, the power failure detection circuit 1 disconnects the charging circuit 31 from the second power supply system 60-2 in step S205. More specifically, as shown in FIG. 8, the power failure detection circuit 1 controls the second switch unit 3 through the wiring 12 so as to switch a contact point to be connected to the input terminal $IN_3$ from the contact point "e" to the contact point "d".

As described above, in the electric power converter according to the second embodiment of the present invention, the electric current flowing through the smoothing capacitor 41 is directly detected. Therefore, the charging circuit 31 is made sure to be interposed and the electric current flowing through the smoothing capacitor 41 can be inhibited for the duration of time in which the electric current that is larger than that in the steady state flows through the smoothing capacitor 41. Also, since the charging circuit 31 is not made interposed after the electric current flowing through the smoothing capacitor 41 returns to the steady state, it is possible to prevent heat generation and the like in the charging circuit 31.

As described above, in the electric power converter according to the embodiments of the present invention, it is possible to switch the power supply systems in a stable manner in the event of a power failure, while preventing an increase in the number of parts, a voltage drop across the power supply system, and an increase in heat generated in the electric power converter.

What is claimed is:

1. An electric power converter comprising:
    a power failure detection circuit connected to a plurality of power supply systems, for detecting a power failure state of each of the plurality of power supply systems;
    a first switch unit having a plurality of contact points connected to the plurality of power supply systems and one output terminal, and when said power failure detection circuit detects a power failure of at least one of the plurality of power supply systems, the first switch unit performs switching so as to connect to the output terminal of the contact point connected to one of the power supply systems other than the power supply system having the detected power failure, in accordance with a power failure detection result of said power failure detection circuit;
    a second switch unit having a charging circuit for inhibiting an inrush current from the plurality of power supply systems and one input terminal connected to the output terminal of said first switch unit, and said second switch unit performs switching so as to connect the input terminal to a contact point on an input side of the charging circuit for a predetermined duration of time in synchronization with the switching among the power supply systems by said first switch unit; and
    an electric power conversion circuit connected to the output terminal of said second switch unit.

2. The electric power converter according to claim 1, wherein said second switch unit includes a direct connecting portion which is arranged in parallel with the charging circuit.

3. The electric power converter according to claim 1, further comprising:
a current detection circuit for detecting an electric current flowing from said second switch unit to said electric power conversion circuit, wherein
said power failure detection circuit determines the predetermined duration of time for which the charging circuit is connected, by controlling said second switch unit based on the electric current detected by said current detection circuit.

* * * * *